(12) United States Patent
Yang et al.

(10) Patent No.: US 11,034,367 B2
(45) Date of Patent: Jun. 15, 2021

(54) DIESEL MULTIPLE UNIT, AND ELECTRICITY SUPPLY SYSTEM AND TRACTION CONTROL METHOD THEREFOR

(71) Applicant: CRRC ZHUZHOU LOCOMOTIVE CO., LTD, Hunan (CN)

(72) Inventors: Ying Yang, Hunan (CN); Ande Zhou, Hunan (CN); Yunlong Li, Hunan (CN); Bin Liu, Hunan (CN); Aijun Chen, Hunan (CN); Libing Fan, Hunan (CN)

(73) Assignee: CRRC ZHUZHOU LOCOMOTIVE CO., LTD, Hunan (CN)

( * ) Notice: Subject to any disclaimer, the term of this patent is extended or adjusted under 35 U.S.C. 154(b) by 39 days.

(21) Appl. No.: 16/325,188

(22) PCT Filed: Dec. 13, 2016

(86) PCT No.: PCT/CN2016/109695
§ 371 (c)(1),
(2) Date: Feb. 13, 2019

(87) PCT Pub. No.: WO2018/040367
PCT Pub. Date: Mar. 8, 2018

(65) Prior Publication Data
US 2019/0193757 A1    Jun. 27, 2019

(30) Foreign Application Priority Data

Aug. 30, 2016 (CN) .......................... 201610773049.X

(51) Int. Cl.
*B60L 50/15* (2019.01)
*B61C 3/00* (2006.01)
(Continued)

(52) U.S. Cl.
CPC ................ *B61C 3/00* (2013.01); *B60L 50/10* (2019.02); *B60L 50/15* (2019.02); *B60L 50/40* (2019.02);
(Continued)

(58) Field of Classification Search
CPC .... B61C 3/00; B61C 5/00; B61C 7/04; B61C 9/24; B60L 50/10; B60L 50/15;
(Continued)

(56) References Cited

U.S. PATENT DOCUMENTS 5,596,465 A * 1/1997 Honda ..................... G05F 1/573
323/284
6,424,156 B1 * 7/2002 Okamura ................. B60L 50/40
324/426
(Continued)

FOREIGN PATENT DOCUMENTS

| CN | 101797894 A | 8/2010 |
|---|---|---|
| CN | 102083665 A | 6/2011 |

(Continued)

OTHER PUBLICATIONS

MORNSUN "DC/DC Converter PVxx-29Bxx Series" pp. 1-4, Feb. 26, 2016 (Year: 2016).*
(Continued)

*Primary Examiner* — Pinping Sun
(74) *Attorney, Agent, or Firm* — Yue (Robert) Xu; Apex Attorneys at Law, LLP

(57) ABSTRACT

There are provided a power supply system for a diesel multiple-unit train, a diesel multiple-unit train including the power supply system, and a traction control method for a diesel multiple-unit train. The power supply system includes: a diesel power pack, a traction inverter connected to a traction motor, and an auxiliary inverter connected to a train load. The power supply system further includes a direct
(Continued)

current chopper and a supercapacitor. A high-voltage side of the direct current chopper is connected to the diesel power pack, and a low-voltage side of the direct current chopper is connected to the supercapacitor. The supercapacitor is connected to the traction inverter and the train load.

6 Claims, 3 Drawing Sheets

(51) Int. Cl.
*B61C 5/00* (2006.01)
*B60L 50/10* (2019.01)
*B61C 7/04* (2006.01)
*B60L 50/40* (2019.01)
*B61C 9/24* (2006.01)

(52) U.S. Cl.
CPC ............... *B61C 5/00* (2013.01); *B61C 7/04* (2013.01); *B61C 9/24* (2013.01); *B60L 2200/26* (2013.01); *Y02T 10/70* (2013.01); *Y02T 10/7072* (2013.01); *Y02T 10/72* (2013.01)

(58) Field of Classification Search
CPC .. B60L 50/40; B60L 2200/26; B60L 2210/40; B60L 2210/10; B60L 1/00; Y02T 10/7022; Y02T 10/7241; Y02T 10/7077
See application file for complete search history.

(56) References Cited

U.S. PATENT DOCUMENTS

| | | | | |
|---|---|---|---|---|
| 7,855,902 B2* | 12/2010 | Goto | ............... | H02M 3/156 363/50 |
| 8,013,555 B2* | 9/2011 | Thornell-Pers | ......... | H02P 13/06 318/432 |
| 8,016,061 B2* | 9/2011 | Jeon | ................. | B60L 3/0053 180/65.22 |
| 8,773,064 B2* | 7/2014 | Kim | ................. | B60L 50/16 320/104 |
| 2002/0109406 A1* | 8/2002 | Aberle | ................. | B60L 58/30 307/10.1 |
| 2006/0018138 A1* | 1/2006 | Iwakura | ................. | H02M 3/158 363/89 |
| 2008/0123225 A1* | 5/2008 | Matsubara | ............. | H02M 1/32 361/15 |
| 2009/0176417 A1* | 7/2009 | Rembach | ............... | B63H 21/17 440/6 |
| 2011/0108340 A1 | 5/2011 | Cherouvrier | | |
| 2014/0077607 A1* | 3/2014 | Clarke | ............. | H02J 7/0045 307/75 |
| 2014/0288749 A1 | 9/2014 | Dumrongkietiman et al. | | |
| 2015/0214761 A1* | 7/2015 | Kono | ................. | B60L 15/2045 320/107 |
| 2016/0068068 A1 | 3/2016 | Stemmler et al. | | |
| 2017/0267105 A1* | 9/2017 | Fratelli | ................. | B60L 7/12 |
| 2018/0131222 A1* | 5/2018 | Nepote | ................. | H02P 6/04 |

FOREIGN PATENT DOCUMENTS

| | | | |
|---|---|---|---|
| CN | 202080279 U | | 12/2011 |
| CN | 102427262 A | * | 4/2012 |
| CN | 202978815 U | * | 6/2013 |
| CN | 103481787 A | | 1/2014 |
| CN | 103496327 A | | 1/2014 |
| CN | 103516046 A | | 1/2014 |
| CN | 203580676 U | * | 5/2014 |
| CN | 203580676 U | | 5/2014 |
| CN | 203681549 U | | 7/2014 |
| CN | 203681549 U | * | 7/2014 |
| CN | 104024025 A | | 9/2014 |
| CN | 103072492 B | * | 5/2015 |
| CN | 105209285 A | | 12/2015 |
| CN | 105857320 A | | 8/2016 |
| CN | 106114531 A | | 11/2016 |
| KR | 20130074691 A | | 7/2013 |
| WO | WO-2010001070 A1 * | 1/2010 | ............ B60W 10/08 |
| WO | 2014206079 A1 | | 12/2014 |

OTHER PUBLICATIONS

International Search Report for PCT/CN2016/109695 dated May 25, 2017, ISA/CN.
SIPO First Office Action corresponding to Application No. 201610773049.X; dated Jan. 25, 2018.
SIPO Second Office Action corresponding to Parallel Application No. 201610773049.X; dated Sep. 18, 2018.

* cited by examiner

DIESEL MULTIPLE UNIT, AND ELECTRICITY SUPPLY SYSTEM AND TRACTION CONTROL METHOD THEREFOR

This application is the national phase of PCT International Patent Application PCT/CN2016/109695, filed on Dec. 13, 2016 which claims the priority to Chinese Patent Application No. 201610773049.X, titled "DIESEL MULTIPLE UNIT, AND ELECTRICITY SUPPLY SYSTEM AND TRACTION CONTROL METHOD THEREFOR", filed on Aug. 30, 2016 with the Chinese Patent Office, both of which are incorporated herein by reference in their entireties.

FIELD

The present disclosure relates to the technical field of multiple-unit trains, and in particular to a power supply system for a diesel multiple-unit train, a diesel multiple-unit train including the power supply system, and a traction control method for a diesel multiple-unit train.

BACKGROUND

Multiple-unit trains are main vehicles for transporting railway passengers. The existing multiple-unit trains may include electric multiple-unit trains and diesel multiple-unit trains. A train is powered by a power supply main circuit of the train.

The main circuit of an electrical transmission diesel multiple-unit train generally includes a diesel power pack, a main inverter and an auxiliary inverter. In the main circuit of a conventional diesel multiple-unit train, a battery hybrid structure or a diesel electric power hybrid structure may further be included, which is based on the idea that a battery or a traction net is added in a conventional structure to supply power to the multiple-unit train using multiple energy sources.

However, in the above power supply main circuit, the diesel power pack has large power, a large volume and a large weight, which does not facilitate arrangement of the diesel power pack.

In summary, an urgent problem to be solved by those skilled in the art is to effectively solve problems existing in the power supply system for the diesel multiple-unit train, such as the large power, the large volume and the large weight of the diesel power pack, so as to facilitate the arrangement of the diesel power pack.

SUMMARY

In view of the above, a first object of the present disclosure is to provide a power supply system for a diesel multiple-unit train, which can effectively solve problems such as large power, a large volume and a large weight of a diesel power pack in the power supply system, so as to facilitate arrangement of the diesel power pack. A second object of the present disclosure is to provide a diesel multiple-unit train including the power supply system described above. A third object of the present disclosure is to provide a traction control method for a diesel multiple-unit train.

In order to achieve the first object, the following technical solutions are provided in the present disclosure.

A power supply system for a diesel multiple-unit train is provided. The power supply system includes: a diesel power pack, a traction inverter connected to a traction motor, and an auxiliary inverter connected to a train load. The power supply system further includes a direct current chopper and a supercapacitor. A high-voltage side of the direct current chopper is connected to the diesel power pack, and a low-voltage side of the direct current chopper is connected to the supercapacitor. The supercapacitor is connected to the traction inverter and the train load.

Preferably, in the power supply system for a diesel multiple-unit train, the direct current chopper is a resonance-type buck direct current chopper.

Preferably, in the power supply system for a diesel multiple-unit train, a filtering device is connected between the auxiliary inverter and the train load.

Preferably, in the power supply system for a diesel multiple-unit train, the diesel power pack includes: a diesel engine, a permanent magnet generator connected to the diesel engine, and a diode rectifier connected to the permanent magnet generator.

Preferably, in the power supply system for a diesel multiple-unit train, an isolating contactor is connected between the supercapacitor and the direct current chopper and is configured to provide overcurrent protection for the supercapacitor.

Preferably, in the power supply system for a diesel multiple-unit train, an isolating contactor is connected between the diesel power pack and the direct current chopper.

The power supply system for a diesel multiple-unit train provided in the present disclosure includes: a diesel power pack, a traction inverter, an auxiliary inverter, a direct current chopper and a supercapacitor. The traction inverter is connected to a traction motor. The auxiliary inverter is connected to a train load. A high-voltage side of the direct current chopper is connected to the diesel power pack, and a low-voltage side of the direct current chopper is connected to one side of the supercapacitor. The other side of the supercapacitor is connected to the traction inverter and the train load.

With the supply power system for a diesel multiple-unit train provided in the present disclosure, the diesel power pack supplies power to the supercapacitor, and the supercapacitor serves as an energy storage to supply power to the traction inverter and the auxiliary inverter. The traction inverter outputs three-phase variable-frequency and variable-voltage alternating current power to supply power to the traction motor. The auxiliary inverter outputs three-phase fixed-frequency and fixed-voltage alternating current power to supply power to an on-board three-phase auxiliary load, and outputs direct current power of 110V (or 24V) to supply power to an on-board direct current load. In a traction condition, the supercapacitor can provide temporal high power, for starting-up and acceleration of the train. In this case, a small diesel power pack may be adopted in the train to reduce a volume and a weight of the diesel power pack, thereby facilitating arrangement of the diesel power pack on the train and reducing a weight of the train. In a braking condition, braking energy fed back from the traction motor can be absorbed and stored in the supercapacitor, for a next starting-up of the train. In this way, the regenerated energy obtained in the braking of the train can be recycled during the whole train operation, thereby achieving energy saving and emission reduction. Further, the supercapacitor is provided as an intermediate structure, greatly simplifying control for an intermediate voltage, and enhancing system stability and control simplicity.

In order to achieve the second object, a diesel multiple-unit train is further provided in the present disclosure, which includes any one power supply system described above. The diesel multiple-unit train including the power supply system has the same technical effect as the power supply system.

In order to achieve the third object, the following technical solutions are provided in the present disclosure.

A traction control method for a diesel multiple-unit train is provided. The diesel multiple-unit train is provided with the power supply system described above. The traction control method includes: starting the diesel power pack to output direct current power so as to charge the supercapacitor via the direct current chopper; detecting, by the direct current chopper, whether a current voltage of the supercapacitor reaches a set value; and starting, if it is detected that the current voltage of the supercapacitor reaches the set value, the traction inverter and the auxiliary inverter to start the train, or maintaining, if it is detected that the current voltage of the supercapacitor does not reach the set value, the traction inverter and the auxiliary inverter in a stop state until the voltage of the supercapacitor reaches the set value.

With the traction control method for a diesel multiple-unit train provided in the present disclosure, control for an intermediate voltage can be greatly simplified, power of the diesel power pack can be reduced, and a volume and a weight of the diesel power pack can be reduced, thereby facilitating arrangement of the diesel power pack on the train and reducing a weight of the train.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

REFERENCE NUMERALS IN FIGURES

| 101 diesel power pack, | 102 direct current chopper, |
| 103 supercapacitor, | 104 traction inverter, |
| 105 auxiliary inverter, | 106 traction motor. |

In Figures, a direction of energy flowing is indicated by an arrow.

DETAILED DESCRIPTION

There is provided a power supply system for a diesel multiple-unit train according to an embodiment of the present disclosure, to reduce power, a volume and a weight of a diesel power pack, thereby facilitating arrangement of the diesel power pack.

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
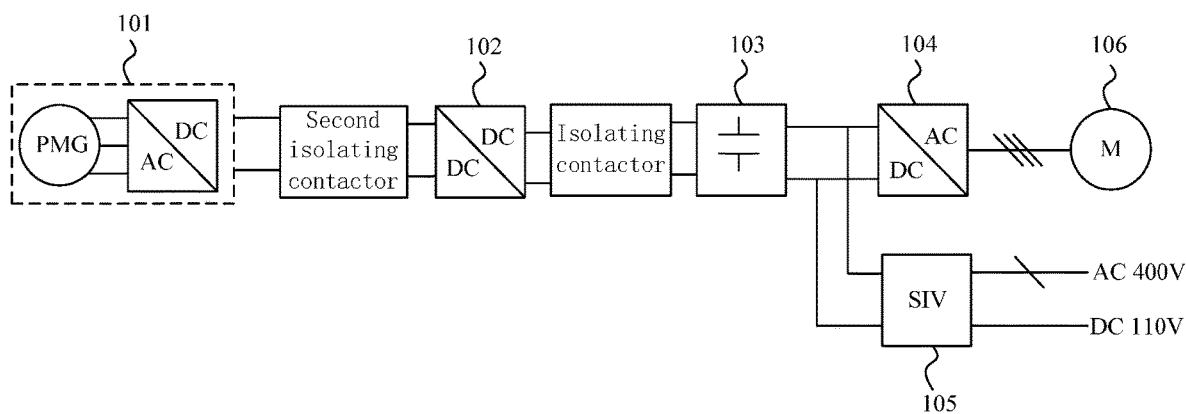
FIG. 1 is a schematic structural diagram of a power supply system for a diesel multiple-unit train according to an embodiment of the present disclosure.
Figure 2:
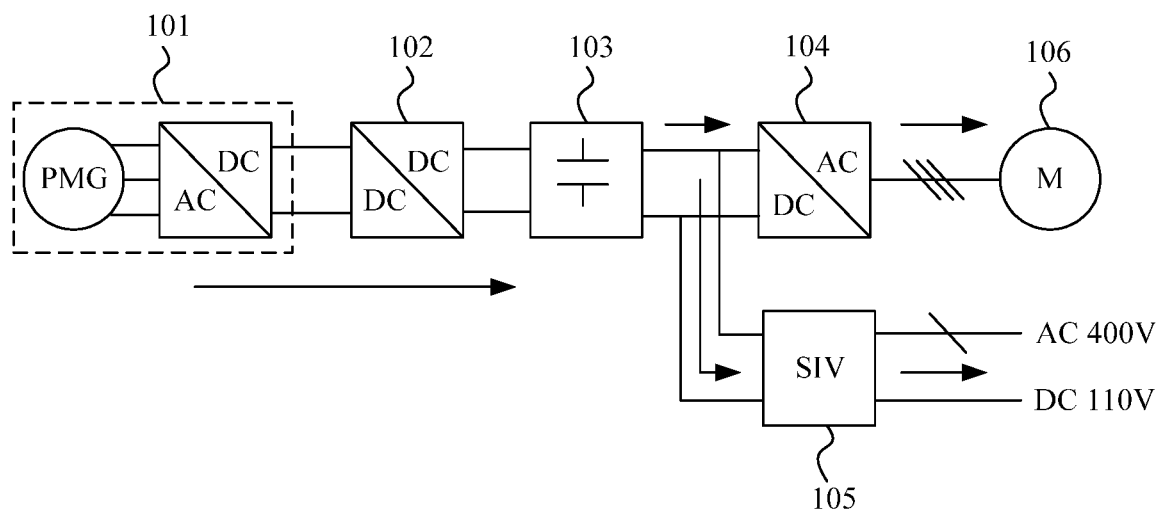
FIG. 2 is a schematic diagram showing energy flowing in the power supply system shown in FIG. 1 in a traction condition.
Figure 3:
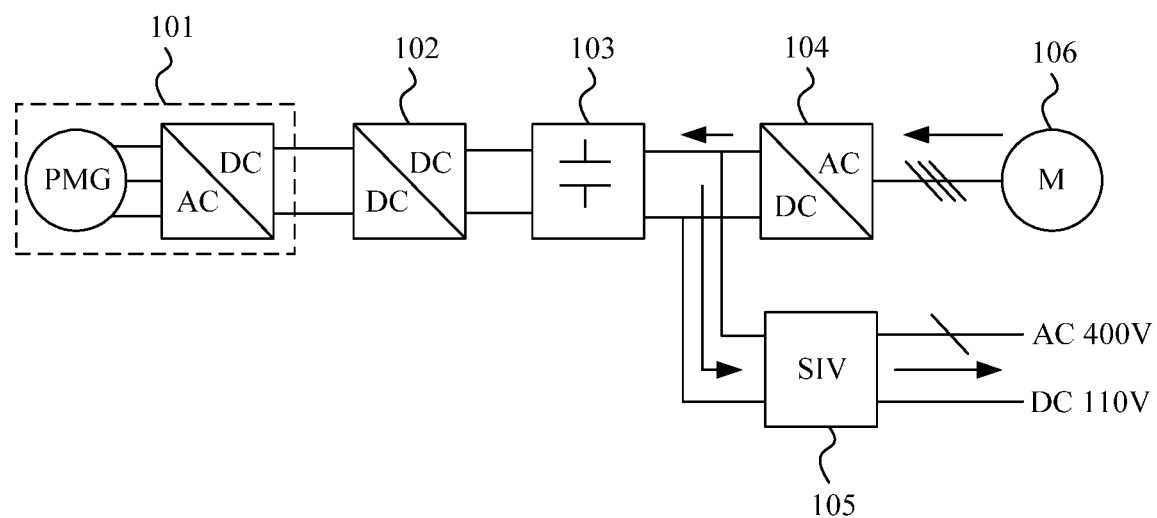
FIG. 3 is a schematic diagram showing energy flowing in the power supply system shown in FIG. 1 in a braking condition.

Reference is made to FIGS. 1 to 3. FIG. 1 is a schematic structural diagram of a power supply system for a diesel multiple-unit train according to an embodiment of the present disclosure. FIG. 2 is a schematic diagram showing energy flowing in the power supply system shown in FIG. 1 in a traction condition. FIG. 3 is a schematic diagram showing energy flowing in the power supply system shown in FIG. 1 in a braking condition.

In a specific embodiment, the power supply system for a diesel multiple-unit train provided in the present disclosure includes: a diesel power pack 101, a traction inverter 104, an auxiliary inverter 105, a direct current chopper 102 and a supercapacitor 103.

The traction inverter 104 is connected to a traction motor 106. The auxiliary inverter 105 is connected to a train load. A high-voltage side of the direct current chopper 102 is connected to the diesel power pack 101, and a low-voltage side of the direct current chopper 102 is connected to one side of the supercapacitor 103. The other side of the supercapacitor 103 is connected to the traction inverter 104 and the train load. That is, the supercapacitor 103 and the diesel power pack 101 are connected in parallel with each other, and are each connected to the traction inverter 104 and the auxiliary inverter 105 so as to supply power to the traction inverter 104 and the auxiliary inverter 105. As shown in FIG. 1, one side of the traction inverter 104 is connected to the supercapacitor 103 and the diesel power pack 101, and one side of the auxiliary inverter 105 is connected to the supercapacitor 103 and the diesel power pack 101. Specifically, the diesel power pack 101 outputs variable-voltage direct current power. The variable-voltage direct current power is stepped down by the direct current chopper 102 (DC/DC) and charges the supercapacitor module. The supercapacitor is used as an energy storage to supply power to the traction inverter 104 and the auxiliary inverter 105. The traction inverter 104 outputs three-phase variable-frequency and variable-voltage alternating current power to supply power to the traction motor 106. The auxiliary inverter 105 outputs three-phase alternating current power and three-phase direct current power to supply power to a three-phase alternating current load and a three-phase direct current load respectively.

Specifically, the diesel power pack 101 includes a diesel engine, a permanent magnet generator connected to the diesel engine, and a diode rectifier (AC/DC) connected to the permanent magnet generator (PMG). The diesel engine drives the permanent magnet generator to output variable-voltage direct current power through the diode rectifier.

In a case that the power supply system is in a traction condition, the train is stationary, the diesel engine is started, and the permanent magnet generator outputs the direct current power to the direct current chopper 102 via the diode rectifier. The direct current chopper 102 detects a current voltage of the supercapacitor 103. In a case that the current voltage of the supercapacitor 103 is lower than a set value such as a DC voltage of 750V, both the traction inverter 104 and the auxiliary inverter 105 are not started, and the direct current chopper 102 charges the supercapacitor 103 until the voltage of the supercapacitor 103 reaches the set value.

When the voltage of the supercapacitor 103 reaches the set value, the traction inverter 104 and the auxiliary inverter 105 are started so as to start the train. Both the supercapacitor 103 and the diesel power pack 101 supply power to each of the traction inverter 104 and the auxiliary inverter 105. The voltage of the supercapacitor 103 is stepped down slowly, and the diesel power pack 101 operates in a rated condition, that is, the diesel power pack 101 operates at maximum efficiency.

Reference is made to FIG. 2, which is a schematic diagram showing energy flowing in the power supply system shown in FIG. 1 in a traction condition. Energy flows from the diesel power pack 101 to the direct current chopper 102 and converges in the supercapacitor 103. Then the energy flows to the traction inverter 104 and the auxiliary inverter 105.

In a case that the power supply system is in a braking condition, the train is electrically braked, the diesel engine is shut down, the permanent magnet generator outputs no power, and the direct current chopper 102 does not operate. The traction motor 106 operates in the braking condition to regenerate energy as a generator. Three-phase alternating current power regenerated by the traction motor 106 is chopped by the traction inverter 104 and flows to the supercapacitor 103 and the auxiliary inverter 105. The voltage of the supercapacitor 103 is stepped up slowly, and the regenerated energy is recycled.

Reference is made to FIG. 3, which is a schematic diagram showing energy flowing in the power supply system shown in FIG. 1 in a braking condition. Energy flows from the traction motor 106 to the traction inverter 104, and then is shunted to the auxiliary inverter 105 and the supercapacitor 103.

In a case that the power supply system is in a coasting condition, the diesel engine operates at rated power, the traction inverter 104 controls the traction motor 106 to output a small torque, so as to control the train to run at a constant speed. The remaining power outputted by the diesel engine flows to the supercapacitor 103 to charge the supercapacitor 103. An amount of power in the supercapacitor 103 is increased slowly.

With the supply power system for a diesel multiple-unit train provided in the present disclosure, the diesel power pack supplies power to the supercapacitor 103, and the supercapacitor 103 serves as an energy storage to supply power to the traction inverter 104 and the auxiliary inverter 105. The traction inverter 104 outputs three-phase variable-frequency and variable-voltage alternating current power to supply power to the traction motor 106. The auxiliary inverter 105 outputs three-phase fixed-frequency and fixed-voltage alternating current power to supply power to an on-board three-phase auxiliary load, and outputs direct current power of 110V (or 24V) to supply power to an on-board direct current load. In the traction condition, the supercapacitor can provide temporal high power, for starting-up and acceleration of the train. In this case, a small diesel power pack may be adopted in the train to reduce a volume and a weight of the diesel power pack 101, thereby facilitating arrangement of the diesel power pack 101 on the train and reducing a weight of the train. In the braking condition, braking energy fed back from the traction motor 106 can be absorbed and stored in the supercapacitor 103, for a next starting-up of the train. In this way, the regenerated energy obtained in the braking of the train can be recycled during the whole train operation, thereby achieving energy saving and emission reduction. Further, the supercapacitor 103 is provided as an intermediate structure, greatly simplifying control for an intermediate voltage, and enhancing system stability and control simplicity.

Specifically, types, structures and connections of the direct current chopper 102, the traction inverter 104 and the auxiliary inverter 105 are illustrated in the conventional technology, which are not limited herein. Preferably, the direct current chopper 102 may be a resonance-type buck direct current chopper 102.

Furthermore, a filtering device is connected between the auxiliary inverter 105 and the train load. The filtering is a process for suppressing and preventing interference, in which frequencies in a specific band in a signal are filtered out. The filtering device may be a filter, that is, a circuit used to allow normal passage of signal components in a certain frequency range and prevent passage of signal components of other frequencies. The inverted three-phase alternating current power is filtered by the filtering device, so that power supply quality can be improved. A structure and an operation principle of the filtering device are illustrated in the conventional technology, which are not described in detail herein. A filtering device may be connected between the traction inverter 104 and the traction motor 106 as required.

Based on the above embodiments, an isolating contactor may be connected between the supercapacitor 103 and the direct current chopper 102 and is configured to provide overcurrent protection for the supercapacitor 103. By arranging the isolating contactor between the supercapacitor 103 and a main circuit bus, the system can be effectively prevented from shutdown due to the short-circuit of the supercapacitor 103. In a case that an overcurrent signal is detected, the isolating contactor is opened, so as to protect the system and the supercapacitor 103. An operation principle and a circuit structure of the isolating contactor are illustrated in the conventional technology, which are not described in detail herein.

Furthermore, an isolating contactor may be connected between the diesel power pack 101 and the direct current chopper 102. In a case that failure occurs in the diesel power pack 101, the isolating contactor is opened, and the diesel power pack 101 is isolated by the system so as to be protected.

Based on the power supply system according to the above embodiments, a diesel multiple-unit train is further provided in the present disclosure. The diesel multiple-unit train includes the power supply system according to any one of the above embodiments. Since the power supply system according to the above embodiments is adopted in the diesel multiple-unit train, the diesel multiple-unit train has the same beneficial effect as the power supply system according to the above embodiments.

A traction control method for a diesel multiple-unit train is further provided in the present disclosure. The traction control method is applied to the power supply system according to the above embodiments. The traction control method includes the following steps S1 and S2.

In S1, the diesel power pack is started to output direct current power so as to charge the supercapacitor via the direct current chopper.

In S2, it is detected whether a current voltage of the supercapacitor reaches a set value. If it is detected that the current voltage of the supercapacitor reaches the set value, the traction inverter and the auxiliary inverter are started to start the train. Otherwise the traction inverter and the auxiliary inverter are maintained in a stop state until the voltage of the supercapacitor reaches the set value.

That is, in a starting process, the diesel power pack firstly operates to charge the super capacitor. When the voltage of the supercapacitor reaches a preset voltage, which generally is a DC voltage of 750V, the traction inverter and the auxiliary inverter are started. In this case, both the diesel power pack and the supercapacitor supply power to each of the traction inverter and the auxiliary inverter, and the traction inverter further supplies power to the traction motor. In this way, the traction converter and the auxiliary converter are started such that the train is started.

With the traction control method for a diesel multiple-unit train provided in the present disclosure, the supercapacitor can provide temporal high power, for starting-up and acceleration of the train. In this case, a small diesel power pack may be adopted in the train to reduce a volume and a weight of the diesel power pack, thereby facilitating arrangement of the diesel power pack on the train and reducing a weight of the train. Further, the supercapacitor is provided as an intermediate structure, greatly simplifying control for an intermediate voltage, and enhancing system stability and control simplicity.

The embodiments in this specification are described in a progressive way, each of the embodiments emphasizes differences from other embodiments, and the same or similar parts among the embodiments can be referred to each other.

Based on the above description of the disclosed embodiments, those skilled in the art can implement or carry out the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A power supply system for a diesel multiple-unit train, comprising: a diesel power pack; a traction inverter connected to a traction motor; an auxiliary inverter connected to a train load; a direct current chopper; and a supercapacitor, wherein the diesel power pack Is configured to output variable-voltage direct current power, the direct current chopper is configured to step down the variable-voltage direct current power and charge the supercapacitor by using the stepped-down variable-voltage direct current power, a first-voltage side of the direct current chopper is connected to the diesel power pack, a second-voltage side of the direct current chopper is connected to the supercapacitor, wherein the first voltage is higher than the second voltage, and the supercapacitor is connected to the traction inverter and the train load, wherein power flows bi-directionally between the supercapacitor and the traction inverter, the supercapacitor is connected in a main circuit consisting of the diesel power pack, the direct current chopper, the traction inverter connected to the tractor motor, and the auxiliary inverter connected to the train load, and there is only one direct current chopper in the main circuit, wherein an isolating contactor is connected between the supercapacitor and the direct current chopper and is configured to provide overcurrent protection for the supercapacitor, and a second isolating contactor is connected between the diesel power pack and the direct current chopper, wherein the isolating contactor and the second isolating contactor is controlled to open or close based on whether there is an overcurrent signal detected.

2. The power supply system for the diesel multiple-unit train according to claim 1, wherein the direct current chopper is a resonance-type buck direct current chopper.

3. The power supply system for the diesel multiple-unit train according to the claim 1, wherein a filter is connected between the auxiliary inverter and the train load.

4. The power supply system for the diesel multiple-unit train according to claim 1, wherein the diesel power pack comprises:
   a diesel engine;
   a permanent magnet generator connected to the diesel engine; and
   a diode rectifier connected to the permanent magnet generator.

5. The diesel multiple-unit train, comprising: the power supply system according to claim 1.

6. A traction control method for the diesel multiple-unit train, wherein the diesel multiple-unit train is provided with the power supply system according to claim 1, and the traction control method comprises:
   starting the diesel power pack to output direct current power so as to charge the supercapacitor via the direct current chopper;
   detecting, by the direct current chopper, whether a current voltage of the supercapacitor reaches a set value; and
   starting, if it is detected that the current voltage of the supercapacitor reaches the set value, the traction inverter and the auxiliary inverter to start the train, or maintaining, if it is detected that the current voltage of the supercapacitor does not reach the set value, the traction inverter and the auxiliary inverter in a stop state until the current voltage of the supercapacitor reaches the set value.

\* \* \* \* \*